United States Patent Office 2,718,784
Patented Sept. 27, 1955

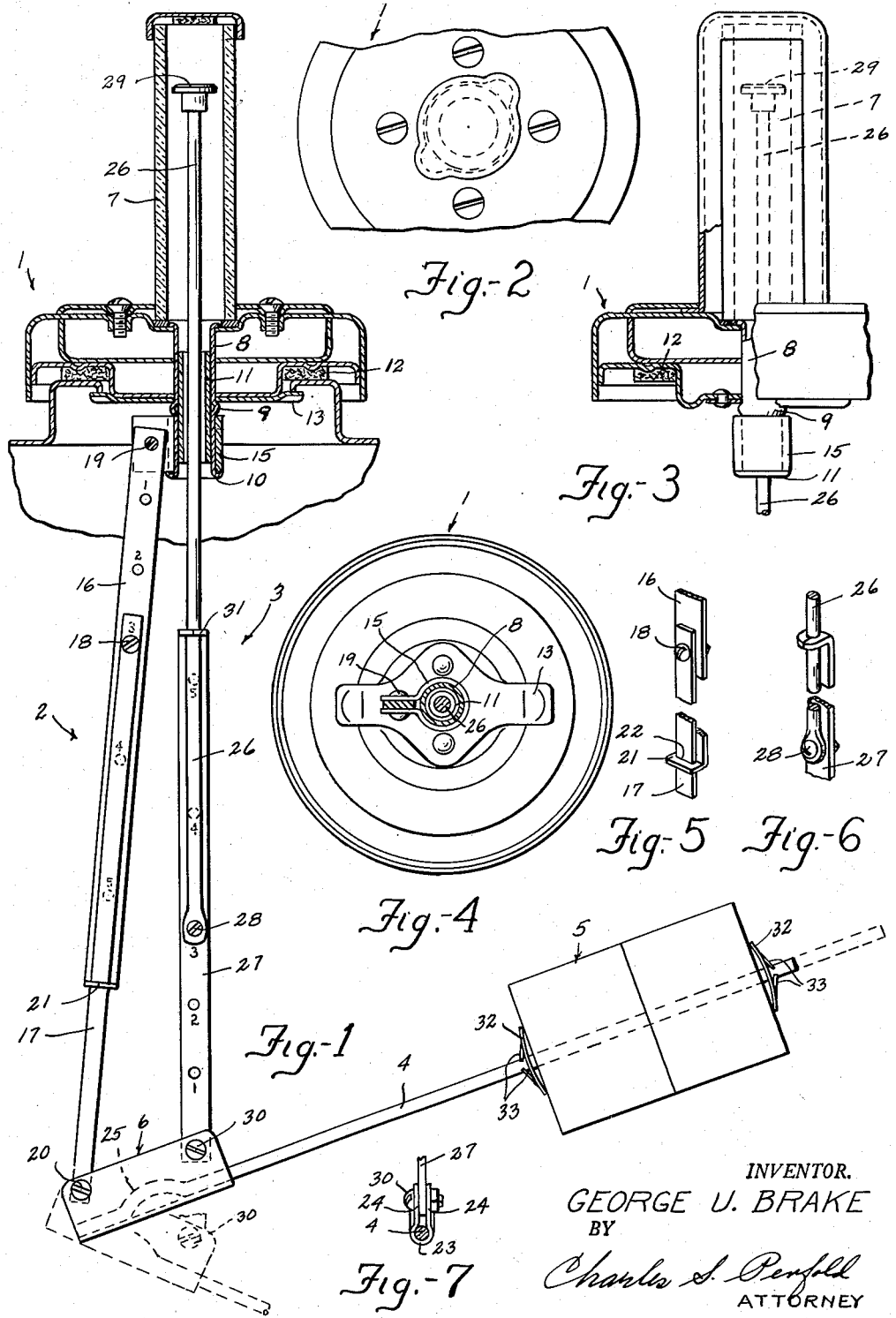

2,718,784

LIQUID LEVEL GAUGE

George U. Brake, Fort Wayne, Ind.

Application May 25, 1953, Serial No. 357,077

6 Claims. (Cl. 73—317)

This invention relates generally to indicating devices and more particularly is directed to what is known in the trade as a liquid level gauge of a kind primarily adapted for indicating the level or quantity of gasoline in a tank or reservoir of an automotive vehicle.

Some gasoline gauges require an electrical current for their operation while others are strictly of the mechanical type. The gauge embodying the subject invention is of the mechanical type.

Gauges of this character are generally constructed to meet the specifications or requirements of the vehicle or motor manufacturer. As a result, specifications with respect to tank capacities vary considerably throughout the industry, and since tanks of different capacities require gauges of different sizes it is necessary to maintain relatively high inventories of gauges of assorted sizes. Keeping large quantities of gauges on hand and the making of new dies and tools for manufacturing a multitude of various components or parts for all sizes of gauges constitute heavy or expensive burdens with respect to manufacture and sale of such products.

With the foregoing in mind, one of the principal objects of the invention is to provide a gauge which may be adjusted to permit its use in tanks or reservoirs of different capacities. For example, one adjustment can be made so that the gauge will render a proper reading or indication of the amount of gasoline or liquid in a tank of a predetermined capacity or size and by a further adjustment the gauge can be used in a tank of a different size or capacity. In other words, by making one or more simple adjustments, the gauge embodying the invention can be utilized to measure liquid in tanks having different capacities. Application of the invention, therefore, will materially reduce high inventories of complete gauges and parts therefor and manufacturing costs.

The gauge incorporating the subject invention, among other things, comprises means for attaching the gauge to a conventional cap or closure for a tank, a lever carrying a float, an extensible hanger having its ends respectively pivotally connected to the attaching means and lever, and an extensible indicator or needle having its lower end pivotally connected to the lever and its upper extremity longitudinally movable within a transparent tube on the cap.

An important object of the invention is to provide the gauge with a hanger preferably comprised of a pair of links or members provided with means whereby they can be selectively detachably secured together at predetermined longitudinal positions so that the length of the hanger may be varied as desired.

Another important object of the invention is to provide the gauge with an indicator preferably comprised of a pair of members which are similarly provided with means whereby they can be selectively detachably secured together at predetermined longitudinal positions to increase or decrease the effective length of the indicator.

A significant object of the invention is to design and construct the means on the hanger and indicator so that they are correlated.

A specific object of the invention is to provide improved means for operatively connecting the float lever to the hanger and indicator, including provision whereby the length of the lever may be varied to suit a particular installation.

Additional objects of the invention are to provide a gauge comprised of parts which can be economically manufactured and assembled on a production basis and one which is durable, positive and efficient in operation.

Other objects and advantages of the invention will become apparent after the description hereinafter set forth is considered in conjunction with the drawings annexed hereto.

In the drawings:

Figure 1 is an elevational view of the gauge embodying the invention, with portions in section;

Figure 2 is a partial top view of the gauge, with the lever and float removed;

Figure 3 is a partial elevational view of a part of the gauge with portions in section;

Figure 4 is a bottom view of the gauge with portions thereof in section;

Figures 5 and 6 respectively illustrate the means employed for detachably securing the members of the hanger and the members of the indicator together; and Figure 7 is a transverse section taken through the means for connecting the lever carrying the float to the hanger and indicator.

As clearly illustrated, the gauge, among other things, includes a conventional cap or closure assembly generally designated 1, a hanger assembly 2, an indicator assembly 3, a lever or arm 4 carrying a float 5, and a connector 6 operatively connecting the hanger and indicator assemblies to the lever.

The cap assembly, among other things, includes an upstanding transparent tube 7, a depending tube or support 8 provided with abutments 9 and 10, and a tubular bearing or guide 11 secured in the tube 8. This cap assembly is also provided with a gasket 12 and a catch 13 for entry into the neck of a tank 14 for detachably connecting the assembly to the tank with the gasket engaging the neck as shown in Figure 1.

An attaching means, preferably in the form of a collar 15 is secured to and freely rotatable on the tube 8 between the abutments 9 and 10.

The hanger assembly 2 is comprised of a pair of members 16 and 17 secured together in overlapping relationship by a bolt 18. The upper end of member 16 is pivotally connected to the collar 15 by a rivet 19 extending through opposed ears on the collar and the lower end of member 17 is pivotally connected to the connector 6 by a bolt 20. Obviously, other forms of fastening means than the bolts and rivet may be utilized to connect the parts together.

The members 16 and 17 may be designed and constructed in various ways, but as herein shown, they are preferably made of flat strip stock. The member 16 is of a slightly greater width than member 17 and preferably provided with five apertures which are longitudinally spaced apart predetermined distances. These apertures constitute abutment means and the bolt 18, also constituting abutment means, is registerable with any one of the apertures. The apertures are identified by any suitable indicia such as numerals 1 through 5. The distance between each adjacent pair of apertures is calibrated or predetermined to meet certain installation requirements and may vary as illustrated.

The member 16 preferably is provided with an offset 21 having a rectangular opening 22 therein which receives the member 17 and maintains the members aligned when secured together in any one of the five extensible relationships permitted by the apertures and bolts.

The connector 6 may be constructed as desired but is preferably made in the form of a channel having a curved base wall 23 and side walls 24. The lever 4 carrying the float is preferably made in the form of a round rod having a curved offset 25 which is fixedly secured in the connector by depressing portions of the side walls 24 about the offset as shown in Figure 7. The lever may be said in include the connector.

The indicator assembly 3 is comprised of a pair of members 26 and 27 secured together in overlapping relationship by a bolt 28. The member 26 is preferably made in the form of a round rod which is freely slidable in the tubular bearing 11 and extends upwardly into the transparent tube 7. The upper end of member 26 is provided with an element 29 for indicating the level of liquid in the tank.

The member 27 is preferably made of flat stock and its lower end is pivotally connected to the connector by a bolt 30. Member 27 is also preferably provided with a split offset 31 which receives the member 26 to hold the members in alignment in substantially the same manner as members 16 and 17 are held. Member 27 is further provided with five longitudinally spaced apertures, identified by numerals 1 through 5, any one of which can receive the bolt 28 for securing the members in different extensible relationships or positions. The distances between the apertures 1 through 5 on member 27 respectively correspond to the distances between the apertures 1 through 5 in member 16 of the hanger.

The members of the hanger and indicator assemblies are preferably connected so that the members 16 and 27, provided with the plurality of apertures, are more or less arranged diagonally, the same being true of members 17 and 26. It will be noted that the plurality of apertures in member 16 run consecutively downwardly from its upper end and that the apertures in member 27 run consecutively upwardly from its lower end. With this unique relationship, as evidenced in Figure 1, the fastening means or bolts 18 and 28 are respectively secured in the apertures 3 in members 16 and 27 to maintain the lever or float arm in a predetermined angular relationship with respect to the hanger and indicator assemblies for a particular installation. For installation in a tank of a smaller capacity or size, the bolts just referred to may be removed and respectively secured in the apertures designated 2 in members 16 and 27 and for a still smaller tank in apertures 1. For larger tanks, the bolts can be respectively secured in either of the apertures 4 or 5, which reduces the effective lengths of the assemblies.

As alluded to above, one object of the invention is to provide a novel float assembly. The assembly illustrated includes the arm 4 and float 5. The float is preferably held in any desired longitudinal position on the arm by a pair of corresponding fasteners 32 carried by the arm. These fasteners are provided with flexible portions 33 which are of a character to permit the fasteners to be slid along the arm to the positions desired and then automatically lock themselves to the arm. The arm is preferably made of a length for use in a tank of maximum size and for smaller tanks the float may be moved in closer to the connector, in which event, the unused free extremity of the arm will be removed, otherwise it might engage a wall of the tank and interfere with the operation of the gauge.

Having thus described my invention, it is obvious that various other modifications may be made in the same without departing from the spirit of my invention; hence I do not wish to be understood as limiting myself to the exact form, construction, arrangement and combination of parts herein shown and described or uses mentioned.

I claim:

1. A gauge assembly for determining the level of a liquid in a tank, said gauge assembly comprising a cap provided with a depending centrally disposed tubular support, a collar attachment rotatably mounted on the support, a lever for carrying a float, an extensible hanger having its ends respectively connected to the lever and attachment, and an extensible indicator having one end movable in the support and its other end pivotally connected to the lever.

2. A gauge assembly for determining the level of a liquid in a tank, said gauge assembly comprising a support provided with a depending centrally disposed tubular guide, a collar attachment rotatably mounted on the guide, a lever for carrying a float, a hanger having its ends respectively connected to the lever and attachment, an indicator having one end movable in the guide and its other end pivotally connected to the lever, and said hanger and indicator each being comprised of a pair of members connectable together in a number of selective positions.

3. A gauge assembly for determining the level of a liquid in a tank, said gauge assembly comprising a cap provided with a depending centrally disposed tubular support, a collar attachment rotatably mounted on the support, a connector, a lever for carrying a float, said lever being secured to said connector, an extensible hanger having its ends respectively connected to the connector and attachment, and an extensible indicator having one end movable in the support and its other end pivotally connected to the connector.

4. A gauge assembly for determining the level of a liquid in a tank, said assembly comprising a cap provided with a depending centrally disposed tubular support, a collar attachment rotatably mounted on the support, a lever for carrying a float, an extensible indicator freely slidable in the support and having one extremity extending above the cap for indication and its other extremity being pivotally connected to the lever, and a hanger having its ends respectively pivotally connected to the attachment and lever.

5. A gauge assembly for determining the level of a liquid in a tank, said assembly comprising a support provided with a depending centrally disposed tubular guide, a collar attachment rotatably mounted on the guide, a lever carrying a float, an extensible indicator having one extremity freely slidable in the guide and its other extremity pivotally connected to the lever, and a hanger comprised of a pair of elongated longitudinally adjustable members, said members being respectively pivotally connected to the attachment and lever.

6. A gauge assembly for determining the level of a liquid in a tank, said gauge assembly comprising a cap provided with a depending centrally disposed tubular support, a collar attachment rotatably mounted on the support, a lever for carrying a float, a hanger having its ends respectively connected to the lever and attachment, and an elongated indicator having one end movable in the support and its other end pivotally connected to the lever.

References Cited in the file of this patent

UNITED STATES PATENTS

| 1,072,122 | Johnston | Sept. 2, 1913 |
| 1,634,165 | Williams | June 28, 1927 |
| 1,922,362 | Halversen | Aug. 15, 1933 |
| 2,446,844 | Molaver | Aug. 10, 1948 |